United States Patent [19]
Rochester

[11] 3,961,704
[45] June 8, 1976

[54] CONVEYOR BELT WIPER SYSTEM

[75] Inventor: Beresford Eton Rochester, Jamaica, British W. Indies

[73] Assignee: Kaiser Aluminum & Chemical Corporation, Oakland, Calif.

[22] Filed: Nov. 21, 1974

[21] Appl. No.: 525,806

[52] U.S. Cl. .............................. 198/188; 198/230
[51] Int. Cl.² ........................................ B65G 15/00
[58] Field of Search ............ 198/230, 188, 208, 185

[56] References Cited
UNITED STATES PATENTS

| | | | |
|---|---|---|---|
| 2,393,724 | 1/1946 | Vickers | 198/230 |
| 2,551,123 | 5/1951 | Heller | 18/230 |
| 2,920,751 | 1/1960 | Krupp et al. | 198/208 |

FOREIGN PATENTS OR APPLICATIONS

| | | | |
|---|---|---|---|
| 1,953,493 | 5/1971 | Germany | 198/230 |
| 1,159,738 | 7/1969 | United Kingdom | 198/230 |

*Primary Examiner*—Albert J. Makay
*Assistant Examiner*—James M. Slattery
*Attorney, Agent, or Firm*—Paul E. Calrow; Andrew E. Barlay

[57] ABSTRACT

A wiper system for the removal of sticky and/or moist particulate material such as bauxite or clay from the working surface of endless conveyor belts comprised of a plurality of individually adjustable wipers arranged in parallel fashion at the return side or flite of the belt, located at an angle to the main axis of the belt and flexibly mounted relative to the belt.

4 Claims, 5 Drawing Figures

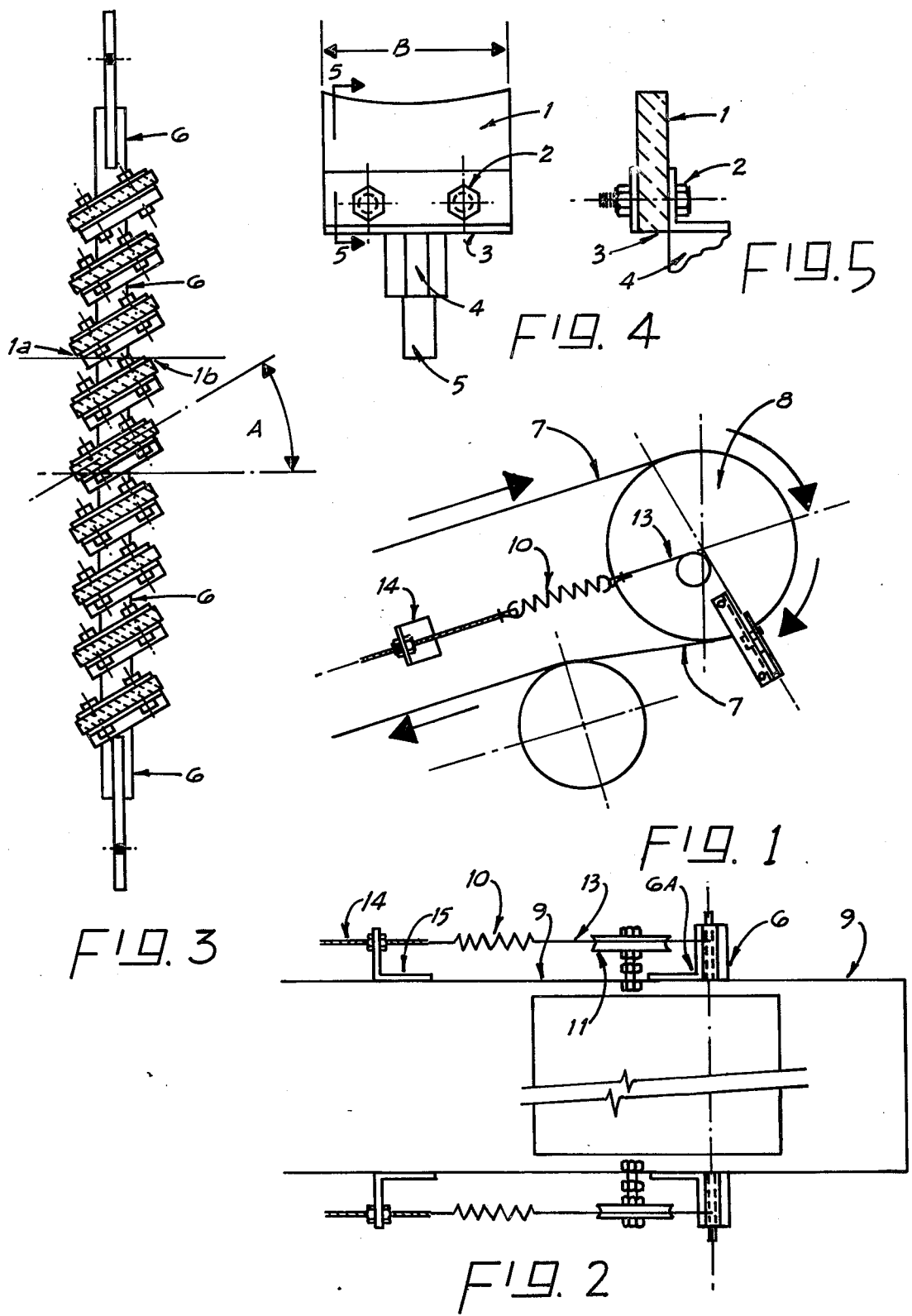

CONVEYOR BELT WIPER SYSTEM

BACKGROUND OF THE INVENTION

Conveyor belt cleaning systems are widely employed to remove adhered material from endless belts which among other things during the return flight of the belt can fall off and can create hazardous conditions. In addition to the hazardous conditions, particularly where sticky and clay-like materials are being conveyed, the adhered material may stay on the belt for extended periods and the accumulations thereof will reduce the efficiency of the conveyor belt operation. To overcome these problems, many devices have already been described, however these devices have either been too complex in construction or they could not satisfactorily cope with moist and clay-like materials. For example, U.S. Pat. No. 2,393,724 describes a belt cleaner, wherein scraper blades are yieldably kept in scraping contact with the belt by using a spring connected rigid lever to provide the desired tension. The tensioning spring is employed only on one side of the belt and consequently the tension exerted on the scrapers will not be uniform across the width of the area to be cleaned. In addition, the rigid lever only allows minor movement of the scrapers and due to this restriction, the scrapers will undergo rapid wear. Another system, shown in U.S. 2,398,821, attempts to overcome the non-uniform operation of the abovedescribed system by using spring tensioning devices on both sides of the belt. However, the rigid connecting levers employed in combination with the scrapers restrict the movement of the scrapers and excessive wear of the cleaning edges occurs. More recently, it was suggested in U.S. Pat. No. 3,101,831 to employ a wiper device for the removal of sticky materials from conveyor belts which adjusts itself in accordance with the load on the belt. The device described in this patent includes spring-biased levers pivoted to a belt frame and rollers to sense the tautness of the belt on its return flight. As the tautness of the belt changes, the rollers actuate the lever, which in turn influences the tension of the spring and thus can adjust the distance of the wiper from the belt. This device improves the operation of the above-described belt cleaning devices in that the spring tensioned levers allow a relatively yieldable movement of the wipers and thus reduced wear. Nevertheless, this device is only aimed at sensing the tautness of the belt during its carrying flight and the wipers will only be moved away from their position, when the tautness of the belt changes. Small quantities of sticky materials adhered to the belt on its return flight prevent the self-adjustment of the wipers and thus removal of material from the belt on its return flight will not be effectively achieved by this device.

SUMMARY OF THE INVENTION

A self-tensioning and resiliently mounted belt wiping system is provided for the cleaning of endless conveyor belts, the system comprising a pair of individually adjustable spring means mounted adjacent the opposing edges of the belt, the spring means being connected to a wiper holder by connecting means trained about a sheave or pulley-like device. The wiper holder is disposed crosswise and preferably substantially across the full width of the conveyor belt. A plurality of wipers are fixedly attached to the holder in generally parallel arrangement to each other and at a selected angle relative to the main axis of the belt. The spring means exert tension on the wiper holder and the force required for constant tensioning is substantially reduced by the use of the sheave or pulley-like device. Also, when the wipers meet increased resistance, the spring means will allow the wipers to yield and without causing excessive wear of the wiper by virtue of being trained in part about a sheave or pulley.

DESCRIPTION OF THE DRAWINGS

FIG. 1 is a schematic side elevational view of a portion of an endless conveyor belt equipped with the novel wiper system including the self-tensioning device therefor;

FIG. 2 is a top plan view of a portion of the endless conveyor belt of FIG. 1 with parts added and showing the self-tensioning device located adjacent the side edges of the endless belt;

FIG. 3 is a top plan view showing the wipers as arranged on the holder;

FIG. 4 shows a side view of a wiper used in the wiper system; and

FIG. 5 is a cross-sectional view taken generally along line 5—5 of FIG. 4.

DETAILED DESCRIPTION OF THE INVENTION

As shown in the various Figures of the drawings, an individual wiper device of the improved wiper system is comprised of wiper blade 1 which can be made of a resilient material, for example rubber. The wiper blade may be straight or planar. In a preferred embodiment of the invention it is curved to match the contour of that portion of the belt where the wiper system is engaged in scraping relationship. Thus, it is preferred to shape the blade section in a slightly concave manner, such as is shown in FIG. 4, so as to have the blade section substantially conform to the curvature of the belt on the head pulley.

Wiper blade 1 is fixedly secured by bolts 2 to wiper frame 3 and in turn, wiper frame 3 is mounted on and affixed to adjusting arm 4 which allows for raising or lowering of the wiper blade relative to belt 7 as desired. If the width of the belt is in excess of about 42 in. (106.7 cm), stiffener 5, such as shown in FIG. 4 may be affixed to frame 3 for stiffening the same.

A plurality of similarly constructed wipers 1 are secured in parallel relation to arm 6 which extends across the entire width of belt 7. The number of wipers employed for cleaning the belt is optional, but for best results it is recommended that the number of wipers be selected in a manner so as to provide for the cleaning of the belt across its entire width. It has been found that with sticky, particulate material, such as for example bauxite, all wiper blades 1 should be arranged at an angle to the main axis of the belt in order to obtain the best cleaning results. While the angle of the wipers (A) in relationship to the main axis of the belt is generally selected on basis of the particular material being conveyed on the endless belt, for sticky, particulate material, such as bauxite, it was found that the angle (A) in relationship to the main axis should be selected within the range of about 25° and 35°, preferably between 28° and 32°. The wipers on the holder or arm 6 are arranged in a substantially parallel relationship to each other and the space between the individual wipers 1 is so arranged that the lower edge 1a of one wiper is essentially in line with the opposing upper edge 1b of the next wiper. The width (B) of each wiper in the wiper system is kept substantially equal and the width (B) selected, generally depends on the width of the endless belt. For example, it has been found that wiper widths of 6 inches (15.24 cm) are suitable for cleaning 36 inch and 42 inch belts (91.4 and 106.7 cm, respectively), while wiper widths of 8 inches (20.3 cm) were found to achieve satisfactory scraping of endless belts of about 60 inches to 72 inches (152.4 and 182.8 cm, respectively).

For best results, the wipers are located at or below the point where the return flite of the belt begins. Preferably, the wiper system is mounted in the vicinity of the belt head pulley 8 at a location below the horizontal axis of the endless belt as shown in FIG. 1.

As mentioned, the wipers are fixedly attached to the wiper holder or arm 6, which as shown in FIG. 3 extends on either side outwardly beyond the edges of belt 7. Each of the opposing extremities of arm 6 are slidably mounted on the sides of the conveyor belt housing 9 (partially shown) in bracket assemblies 6a, which allow the wiper holder to have a limited forward and backward movement, which in turn allows the adjustment of the wipers in relation to the belt. The end portions of the wiper holder or arm 6, on each side of the belt, are connected to a rope-like means such as wire rope 13. Each rope 13 is trained about a sheave or pulley 11, rotatably affixed to the aforesaid housing 9 thus allowing an easy forward or backward movement of rope 13.

The other end of each rope 13 is then connected to an adjustably tensioned spring 10 or the like which in turn is secured to a screw-type adjusting means 14. The spring adjusting means 14 of any known structure is fixedly attached by bracket 15 to the conveyor belt housing or the like. The spring adjusting means serves to set the desired initial tension on the wipers, while the spring 10 itself will allow self-tensioning of the wipers during scraping operation.

In case the distribution of the adhered material on the belt is non-uniform, due for example to adhered lumps of material the wiper system of the instant invention, as a result of the self-tensioning and resilient means employed, allows the wipers to readily adjust their position with regard to the belt. When the material adhered to the belt is removed by the scraping action of the wipers, the wipers immediately return to their original, preset position. The wiper system is also selfcompensating in case the tautness of the belt varies during conveying, as the novel arrangement of the spring means connected to the wiper frame through a sheave, allows nearly instant movement of the wiper holder in any direction or a multiplicity of directions simultaneously without, however, losing its scraping effectiveness.

In addition to these advantages, the novel wiper system is free of complicated moving parts, which were characteristic of the prior art wiper systems. As a result, the operation of the instant wiper system and the adjustment of the wipers is accomplished in a much simpler and efficient manner and thus provide the art with a troublefree and effective belt cleaning system.

What is claimed is:

1. In combination with an endless conveyor belt a self-tensioning and resiliently mounted belt wiper system for removing particulate material from the working surface of the belt, the system comprising a wiper holder, a sheave means and a pair of individually adjustable spring means mounted adjacent the opposing edges of the belt, the spring means being connected to the wiper holder by connecting means trained about the sheave means, the wiper holder being crosswise disposed across the full width of the belt and a plurality of wipers fixedly attached to the holder in substantially parallel arrangement to each other, said wipers being in contact with the belt adjacent the normal point of return thereof and at a selected angle relative to the main axis of the belt.

2. The combination of claim 1, wherein at least certain of the wipers comprise of blades made of a resilient material, the wipers being arranged at a scraping angle from about 25° to about 35° to the main axis of the endless belt.

3. The combination of claim 2, wherein the angle is between about 28° and 32°.

4. The combination of claim 2, wherein the belt contacting surfaces of the blades are shaped in a manner so as to substantially conform to the contour of the belt at the point of engagement with the belt.

* * * * *